C. M. ERTEL.
POWER BALING PRESS.
APPLICATION FILED NOV. 25, 1916.
1,330,584.
Patented Feb. 10, 1920.
6 SHEETS—SHEET 1.
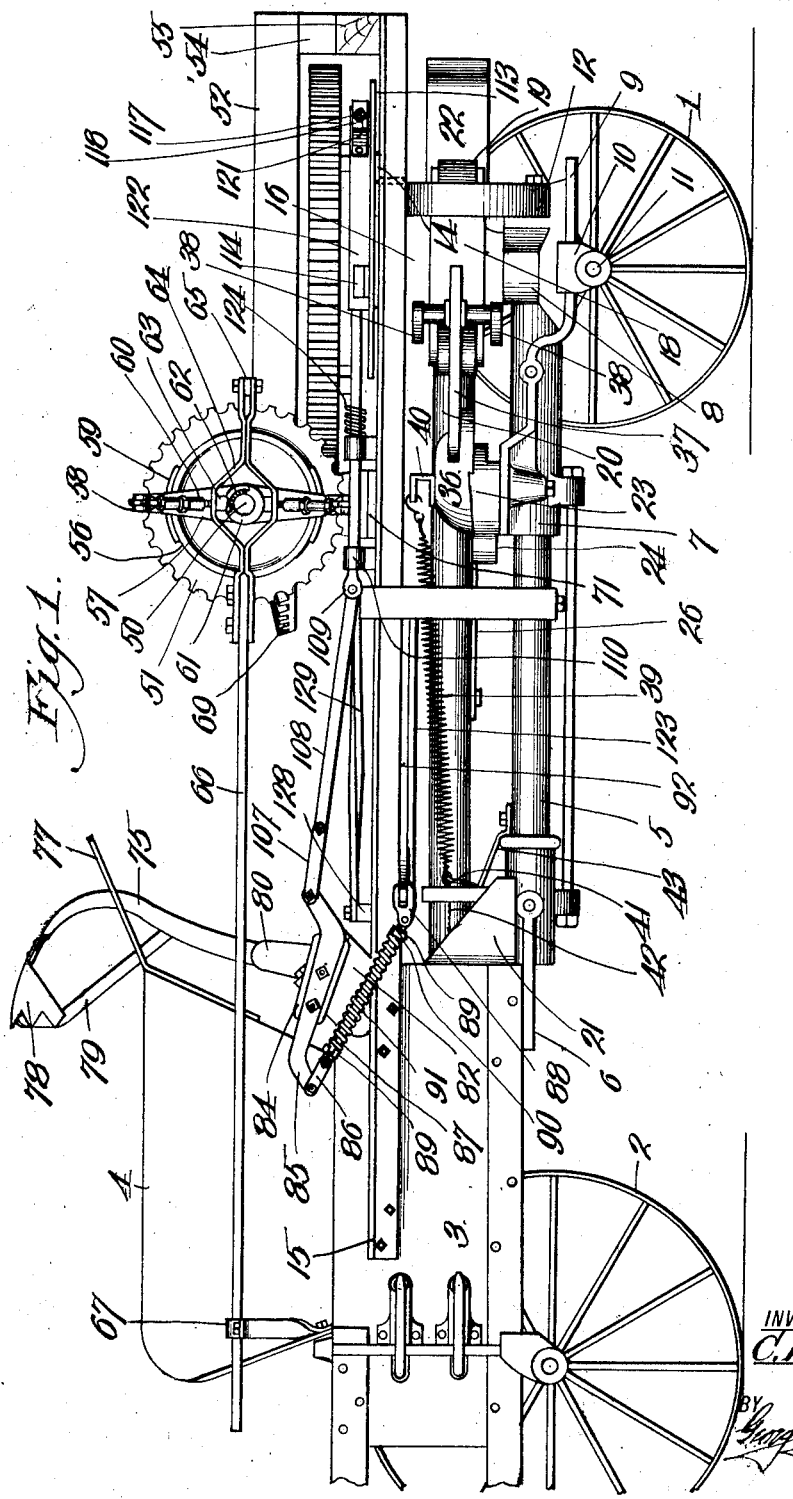
INVENTOR
C. M. Ertel.
BY
ATTORNEY

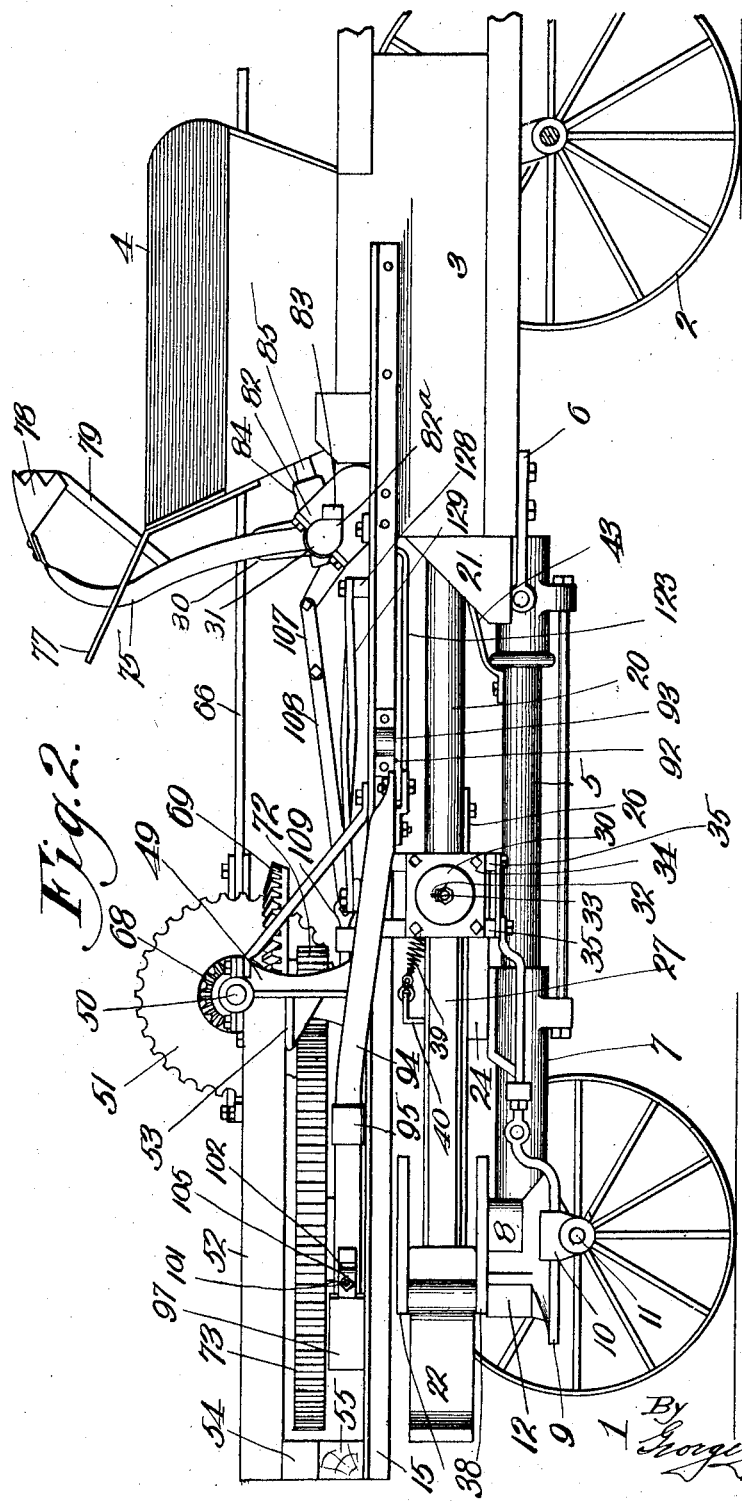

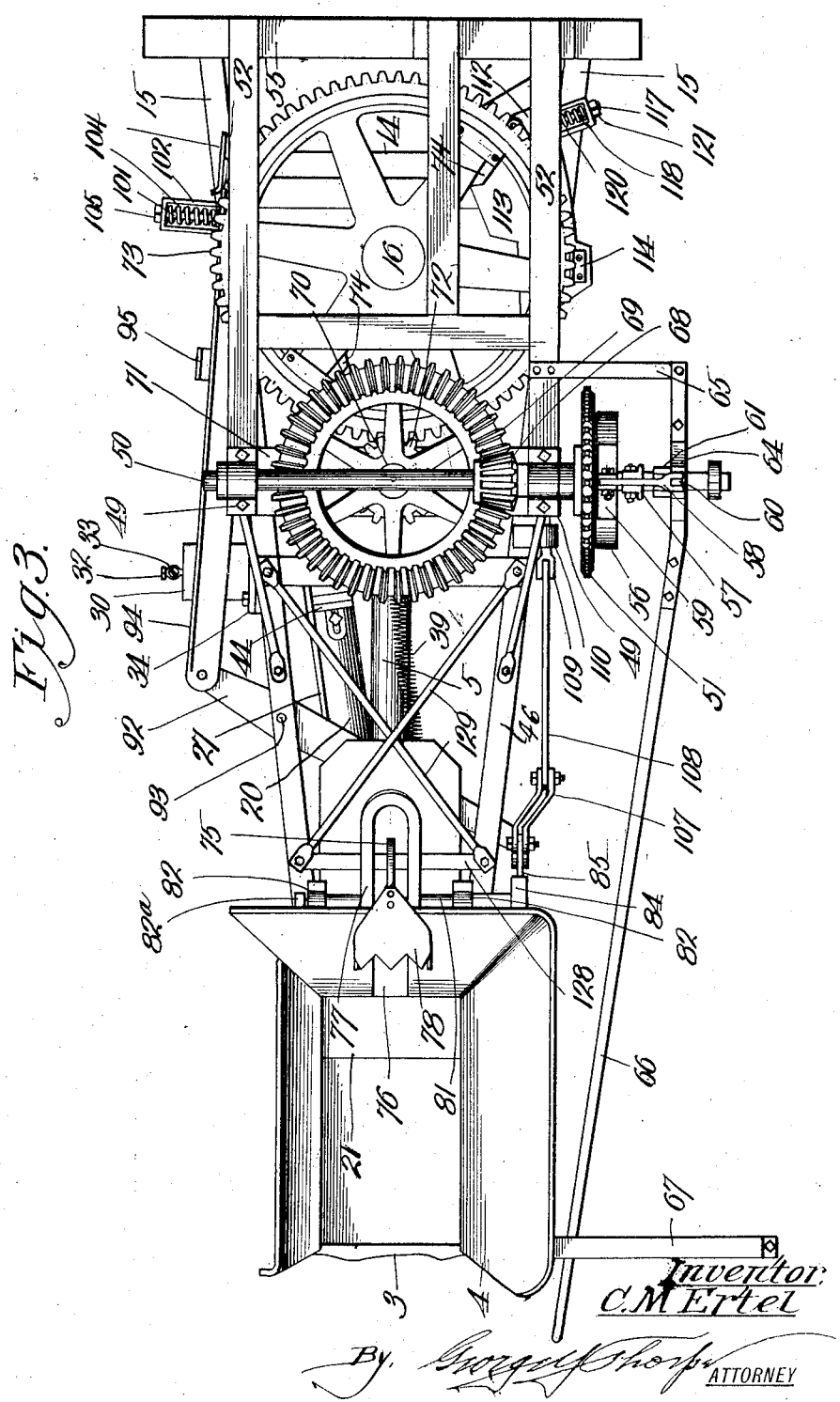

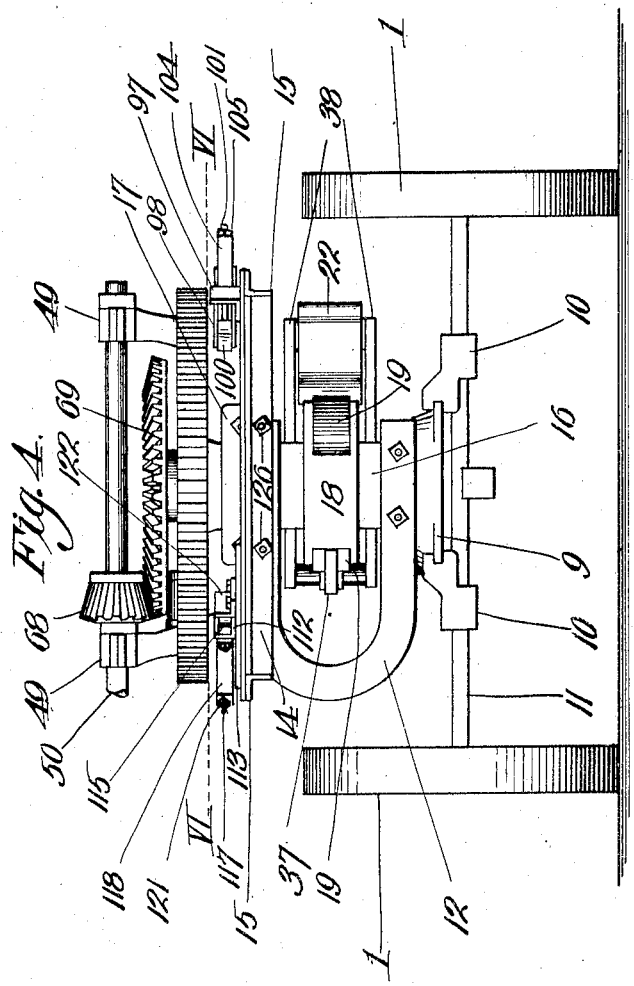

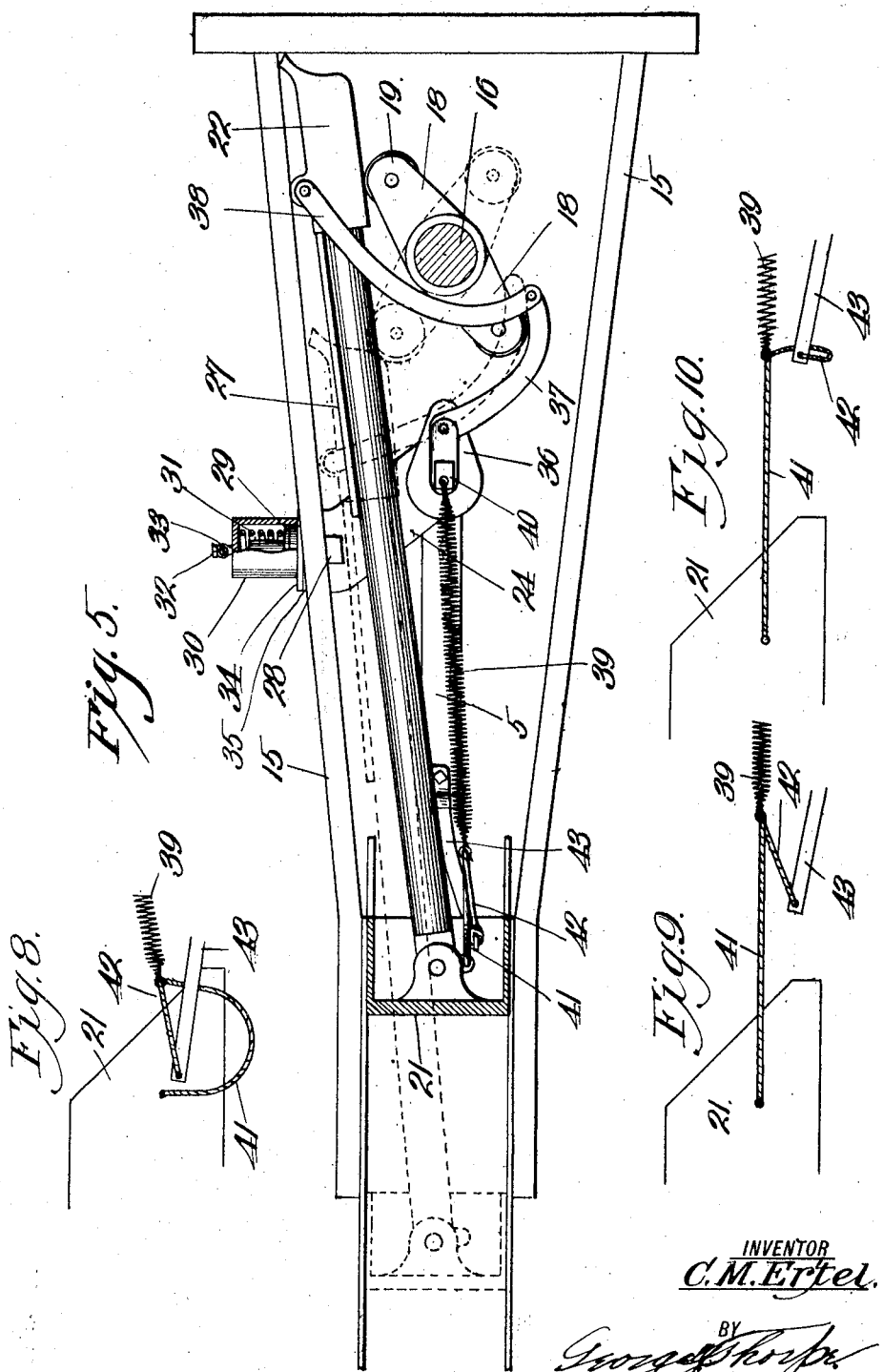

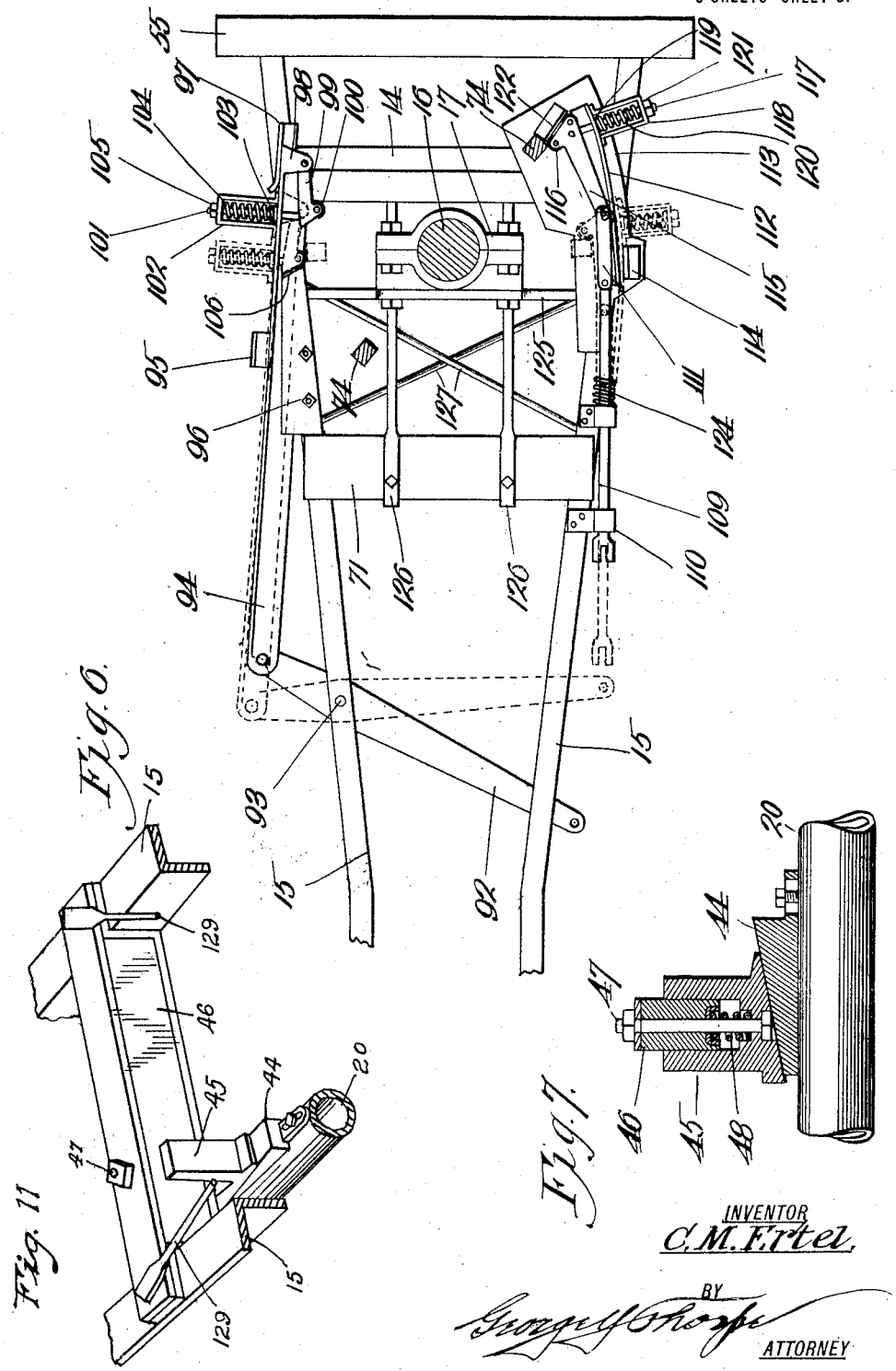

UNITED STATES PATENT OFFICE.

CHARLES M. ERTEL, OF QUINCY, ILLINOIS.

POWER BALING-PRESS.

1,330,584.  Specification of Letters Patent.  Patented Feb. 10, 1920.

Application filed November 25, 1916. Serial No. 133,831.

*To all whom it may concern:*

Be it known that I, CHARLES M. ERTEL, a citizen of the United States, residing at Quincy, in the county of Adams and State of Illinois, have invented certain new and useful Improvements in Power Baling-Presses, of which the following is a specification.

This invention relates to power baling presses, and has for its object to produce a power press which positively effects the feeding and return strokes of the feeder and makes provision for effecting the premature release of the feeder in its power stroke in the event the same encounters an unyielding obstruction.

Another object is to provide a spring for effecting the recoil of the plunger, and means to hold said spring taut at all times and thereby prevent the deterioration thereof which is incidental to the use of any spring which is alternately stretched and then relaxed sufficiently to permit it to sag.

With these general objects in view, the invention consists in certain novel and peculiar features of construction and combinations of parts as hereinafter described and pointed out in the appended claims; and in order that it may be fully understood reference is to be had to the accompanying drawings, in which—

Figure 1, is a side elevation of a power baling press embodying my invention, certain of the parts being omitted and others broken away.

Fig. 2, is a similar view of the opposite side of the press.

Fig. 3, is a top plan view of the press as shown by Figs. 1 and 2.

Fig. 4, is a front elevation of the parts with certain mechanism in the back-ground omitted.

Fig. 5, is a horizontal section taken in the plane of the top of the front portion of the framework.

Fig. 6, is a horizontal section taken on the line VI—VI of Fig. 4.

Fig. 7, is an enlarged vertical section of a brake mechanism for arresting the recoil movement of the plunger.

Fig. 8, is a diagrammatic view showing the position of the connections between the plunger and the spring for effecting the recoil of the former when in its initial position and for preventing the spring from sagging.

Fig. 9 and 10 are views similar to Fig. 8, Fig. 9, showing the plunger in partly advanced position and Fig. 10 showing it wholly advanced.

Fig. 11, is a detail perspective view of part of the framework forming a support for means for gradually checking the recoil of the pitman.

In the said drawings, 1 indicates the front wheels, 2 the rear wheels, 3 the baling chamber, 4 the feed hopper and 5 the reach connected at one end to a bearing 6 secured to the front end of the baling chamber at the underside thereof, and at the other end to a sleeve 7 projecting rearwardly from a bearing 8, said bearing being flanged at 9, to provide the customary fifth wheel upon which the front wheels may turn when the machine is traveling to and from the point of operation, the customary angle brackets 10 slidably engaging the said fifth wheel, and being secured rigidly to the axle 11, upon which the front wheels are journaled.

Arranged transversely and bolted to the upper part of the bearing 8 is a goose-neck 12, the upper arm of the goose-neck forming a support for the bearing 8, and carrying the transverse angle bar or brace 14, connecting the side bars 15, of the front portion of the framework, said side bars in conjunction with the said goose-neck, bearing and reach, constituting said framework.

16 is a vertical shaft step-journaled at its lower end in the bearing 8, and also journaled in a two-part bearing 17, disposed above and spaced from bearing 8, and between said bearings said shaft is equipped with diametrically opposite trip levers 18, provided with the customary anti-friction rollers 19 for engaging and causing a longitudinally-extending pitman 20, to make its power stroke, said pitman being equipped at its rear end with the customary plunger or head-block 21, for reciprocatory action in the baling chamber, and equipped at its front end with a head 22, provided with a recess or pocket in its front end.

To support the pitman so that its head shall be supported at all times in the horizontal plane of the trip levers, a bracket 23, is mounted upon the rear end of sleeve 7 and is equipped with a laterally-projecting shelf 24 which underlies and forms a sliding support for the pitman; the latter being provided at its underside with a wear strip 26. The pitman is also provided at its outer side with a wear strip 27, for engagement at times with the inwardly projecting stem 28 of a piston 29 mounted in a cylinder 30, a spring 31 within the cylinder bearing against the outer end of the same and the piston to hold the stem 28 projected inwardly so that it shall cushion the outwardly swinging movement of the pitman as the same makes its recoil stroke.

The cylinder is provided at its outer end with an air vent 32 controlled by a valve 33 which can be adjusted to vary the resistance offered by air within the cylinder to outward swinging movement of the pitman, it being understood that the spring 31 is employed primarily as a means of returning the piston to its inmost position after the recoil movement of the pitman terminates. The cylinder is provided at its inner end with a flange 34 bolted to a pair of vertically disposed brackets 35 secured at their upper ends to the adjacent side bar 15 and at their lower ends to the adjacent end of the laterally-projecting arm or shelf 24.

36 is a cap mounted upon bracket 23 and constituting a fulcrum for a curved swing arm 37, and the free end of said swing arm is connected in planes above and below that of the trip levers to the head of the pitman, by a pair of curved links 38.

In operation, one of the trip levers engages the concave side of the swingarm 37, as the other trip lever engages and applies pressure outwardly against the head of the pitman to start the same on its power stroke, it being understood that by this arrangement the pitman travels rapidly from the position shown in full lines, Fig. 5, for approximately two-thirds of its stroke, and that when it has traveled approximately the distance mentioned, the trip lever in physical contact with the pitman, enters the recess or pocket at the front end of the head thereof, and the other trip lever rides off the front end of the swingarm. The part of the stroke mentioned is made quickly and under a relatively small expenditure of power, as during such movement the loose hay fed into the baling chamber by the feeder as hereinafter described, offers but little resistance to the travel of the plunger. After the trip lever enters the pocket of the head of the pitman, the movement of the latter is effected more slowly but with greater power, as at this time the final compression of the bale is made, and as the said trip lever passes out of engagement with the pocket as indicated by dotted lines in Fig. 5, the recoil of the pitman occurs, and in such recoil it is guided and cushioned by engagement with the stem of the piston of the air cylinder, it being understood that the connection between the pitman and cap 36 insures the return of the pitman to initial position.

To effect the recoil of the pitman, a retractile spring 39 is attached at its front end to a bracket 40 secured to and at the upper side of the cap 36, and at its opposite end said spring is connected by a chain or the like, 41, to the plunger 21, and by a shorter chain or the like 42, to an anchor 43, secured to and projecting upwardly and rearwardly from the reach. When the plunger is in its initial position, as shown by Figs. 5 and 8, the chain 42 is under sufficient tension to prevent the spring sagging downward. As the plunger makes its power stroke, the spring offers no resistance until the slack is taken out of the chain 41, that is until the parts have attained the position shown by Fig 9, which position they may attain about the time the trip lever increases the application of power on the pitman, and during this part of the travel of the plunger, the spring is stretched from the position shown by Fig. 9, to the position shown by Fig. 10 and the tension is removed from the other chain 42, which is therefore free to sag or hang downward. As the plunger recoils, under the power of the spring, the slack is taken out of the chain 42 and the same is retensioned at the instant the plunger has again attained the position shown by Fig. 9, it being understood that the impetus given to the plunger in its retraction from the position shown by Fig. 10, to the position shown by Fig. 9, completes the recoil movement. It will thus be seen that the spring is maintained continuously under sufficient tension to prevent it from sagging. It is obvious therefore that it is not alternately sagging and straightening as is true in baling presses which have heretofore employed springs to retract the plunger, and in this connection it will be understood that by avoiding alternate sagging and straightening of the spring, its period of service is materially increased.

The recoil of the pitman is positively arrested by a wedge 44 secured to the pitman at its upper side (Figs. 3 and 7) and a block 45 mounted for vertical sliding movement on a cross bar 46 (Fig. 1) extending from one of the bars 15 to the other. A bolt 47 extends through said cross bar and the block 45 to limit downward movement of the latter and prevent it from creepage laterally of the machine, a spring 48 encircling the bolt and bearing at its opposite ends against cross bar 46 and said block, to hold the latter yieldingly depressed in the path of forward movement of the wedge 44, as will be readily understood by reference to Fig. 7.

Mounted upon the side bars 15 of the framework is a pair of bearing standards 49, and journaled therein is a transverse shaft 50 equipped with a journaled sprocket wheel 51 adapted to be driven from a gas engine, not shown, mounted upon a skeleton platform 52 supported at its rear end on shelves 53 projecting from standards 49 and at its front end on blocks 54 mounted upon a cross bar 55 secured on the front extremities of the side bars 15.
Rigidly secured on the sprocket wheel, is a flanged wheel 56 constituting one member of a clutch, the other member of the clutch being constructed as follows: 57 is a bar rigidly secured on shaft 50 and forming a fulcrum for a pair of rock levers 58 equipped at their inner ends with brake shoes 59 for engagement with the flanged wheel 56 when it is desired to transmit power from the sprocket wheel 51 to shaft 50. The outer ends of said levers are connected by extensible links 60 to a slidable collar 61 mounted on the shaft. Said collar is provided with the customary circular groove 62 engaged by inwardly projecting pins 63 on a yoke 64 fulcrumed at its front end on a bar 65 projecting outward from the adjacent side of the platform 52.

A long lever 66 is secured to the other end of the yoke and extends alongside of the hopper 4, and through a guide frame 67 secured to and projecting laterally from the hopper, the arrangement being such that when the lever is swung in one direction by an operator standing near the hopper, it slides the collar 61 upon shaft 50 and effects the clamping of the shoes 59 upon the flanged wheel 56, reverse movement of said lever effecting the release of said shoes as will be readily understood. By means of this lever the operation of the power mechanism and of the feeder hereinafter described can be instantly started or stopped.

To transmit power from the shaft 50 to the power mechanism, said shaft is equipped with a beveled pinion 68 meshing with a horizontally arranged gear 69 journaled on a vertical stub shaft 70 projecting upwardly from and rigidly secured to a cross bar 71 connecting the bearing standards 49, and cast with or otherwise rigidly secured to gear 69 is a gear pinion 72 meshing with a large gear wheel 73 secured rigidly on the upper end of the trip lever shaft 16. Secured to and depending from said gear wheel 73 at diametrically opposite points is a pair of depending lugs 74 (Figs. 3 and 6), each being adapted once in each revolution of said wheel to effect the downward or power stroke of the feeder and the return thereof to elevated position, through mechanism hereinafter described.

The feeder is constructed as follows: 75 is an arm for operation in a vertical slot 76 in the front wall of the hopper and in a continuation of said slot formed by a U-shaped guard 77 projecting upward and forward from the hopper at opposite sides of said slot for the purpose of stiffening the slotted front wall of the hopper. Secured to the upper extremity of the feeder arm 75 is a serrated feeder head, or plate 78, and bracing the same is a bar 79 secured at its opposite ends to the feeder arm and said plate, it being noted that the upper end of said brace bar 79 stands in the plane of the teeth of the head for the purpose of protecting said teeth from injury in the event of striking a hard object, such as a pitchfork or other foreign obstruction in the hopper. It also acts as a guard against such entanglement of the teeth in the baling material as would tend to pull the same upward with the feeder after being compressed thereby in the baling chamber. The feeder arm is secured rigidly to the crank arm 80 projecting from a transverse shaft 81 journaled in bearings 82 at the upper front corners of the baling chamber, said shaft being provided at one end with a peripheral enlargement 82$^a$ to engage a lug 83 on the adjacent bearing 82 for the purpose of positively checking upward movement of the feeder as will be readily seen by reference to Fig. 2. At its opposite end the shaft is provided with a channeled cross-head 84 in which is secured a substantially S-shaped lever 85, said lever occupying a substantially horizontal position when the feeder is elevated, as shown in Fig. 1. The downwardly projecting end or arm of said lever 85 is pivotally connected by a link 86 to one of a pair of bars 87 fitting flatly together, the other bar being pivotally connected to a link 88, and the said bars are each provided at one end with curved flanges 89 which fit over or around the upper and lower edges of the other to hold the bars together. Each bar is also provided with a laterally projecting pin 90 for engagement with the adjacent end of the companion bar for limiting the retractive or shortening movement of the connection composed of said bars and a coiled spring 91 encircling the two bars and bearing at its opposite ends against the flanges 89, the tendency of said spring to apply pressure against the inner edges of said flanges being to resist elongation of said connection between the links 86 and 88.

The link 88 is pivoted to one end of a horizontal rock lever 92 extending across the framework and pivoted at 93 to and at the under side of one of the side bars 15, the opposite end of said lever being pivotally connected to the rear end of an angle bar 94, extending forwardly and inwardly between the adjacent side bar 15 and the large gear wheel 73, the bar at an intermediate point being disposed inward of a guard 95 for limiting outward swinging movement.

The bar 94 is preferably of angle iron formation as shown, and is disposed so that one of its arms shall occupy a vertical and the other a horizontal position, and to avoid unnecessary friction said bar rests upon the guard 95 and is supported thereby above and out of frictional contact with the adjacent side bar 15, and to prevent upward movement of bar 94, a plate 96 is secured to said side bar 15 and overlaps the horizontal arm of said bar (Fig. 6).

When the feeder is in elevated position, the rock lever 92 stands in the position indicated by full lines Fig. 6, and the bar 94 fits against the inner side of the stop 97 secured to the adjacent bar 15. Pivoted to a lug 98 projecting inwardly from the front end of bar 94, is a rearwardly projecting catch 99, equipped with a roller tooth 100, for engagement by lugs 74 of wheel 73 in the rotation of the latter, said catch being provided with a pivoted rod 101 extending slidingly outward through the vertical arm or bar 94 and through a keeper 102 secured to said bar or arm. Within the keeper the rod is provided with a shoulder 103, and bearing against said shoulder and the outer end of the keeper, is a spring 104 for holding the catch 99 pressed yieldingly inward, a nut 105 secured to the outer end of rod 101, serving to limit inward movement of the catch under the action of the spring.

Each lug 74 is adapted upon applying rearward pressure on the roller tooth 100, to slide bar 94 rearward until the rear end of the catch engages the front outwardly and rearwardly beveled end of the plate 96, at which time the front end of the bar 94 is rearward of the rear end of the stop 97. As a result of the arrest of the rearward movement of bar 94, the pressure of the lug 74 effects outward swinging movement of the catch until the same has attained substantially the position shown by dotted lines Fig. 6, by which time the lug clears the roller tooth and offers no obstruction to the return of the bar 94 to its initial position. The rearward movement described of the bar 94, rocks lever 92 and effects the feeding stroke of the feeder, and immediately after such stroke is completed by the tripping of the catch from the path of the actuating lug 74, as explained, the other lug 74 operates mechanism hereinafter described, to reelevate the feeder and incidentally effect the return of the bar 94 to its initial position as shown in full lines, Fig. 6.

107 is a link pivotally connecting lever 85 to a link 108 pivotally connected to a slide bar 109 mounted in supporting guides 110 secured to one of the side bars 15, and pivotally attached to the front end of bar 109 is a bar 111, rigidly secured to an angle plate 112 resting upon a table 113, secured rigidly to the adjacent side bar 15, said table being provided with an upwardly-projecting stop 114 to guide the angle plate in its longitudinal and outward swinging movements hereinafter referred to. A catch 115 is pivoted to and extends forwardly from the bracket 111 and is formed at its inner side with a roller tooth 116 for engagement by the depending lugs 74 of wheel 73 in each revolution of the latter, and to insure such engagement, a rod 117 pivoted to the catch, extends through the upwardly projecting arm of the angle plate 112 and a keeper 118 secured to the outer side of the angle plate. The rod is provided within the keeper, with a collar 119 against which bears a spring 120 arranged within the keeper and bearing against the outer end of the same for the purpose of holding the catch 115 pressed yieldingly into the path of rotation of said lugs 74, a nut 121 engaging the outer end of the rod and keeper to prevent the catch being swung too far inward.

At the forward limit of travel of the catch 115 under the application of force by each lug 74, is a trip-off cam 122, so that as the front end of the catch is forced forwardly against said trip-off cam, the catch is caused to swing outward against the resistance of spring 120, until the actuating lug 74 rides clear of the catch, as will be readily understood by reference to Fig. 6, and in this connection it will be noted that as the angle plate 112 when at its forward limit of movement will offer less resistance to outward swinging movement than the spring 120 will offer to such movement on the part of the catch 115, the said angle plate will swing outward as the trip-off occurs until arrested by the stop 114, as will be understood by reference to the last-named figure.

Owing to the fact that the slide bars 94 and 109 are indirectly connected to the opposite ends of the lever 85, it will be apparent that when the bar 94 is forced rearwardly to swing the feeder downward, the bar 109 with the angle plate and catch 115 will be drawn rearwardly to the position shown by dotted lines, Fig. 6, and that immediately after the downward movement of the feeder is completed, the lug 74 opposite from that instrumental in lowering the feeder, will engage the roller tooth of catch 115, as shown by the dotted lines in Fig. 6, and return the catch 115, angle plate 112 and bar 109 to the position shown in full lines in said figure, this action through the connections described returning the bar 94 to its initial position as shown in full lines, same figure. It will thus be seen that a positive application of power is applied to effect the reëlevation of the feeder as well as its downward or power stroke. It will also be apparent that when the power stroke of the feeder occurs, the feeder may be prematurely released without injury to the mechanism and without interfering with the operation of the catches 99 and 115, due to the fact that the expansive connection between links 86 and 88 will yield. This guards against any possibility of injury to said parts as well as to the feeder.

As will be understood, considerable power is required to start the feeder on its power stroke, but after its operation is started the force of gravity of the feeder would complete such stroke and the chief obstruction to the acceleration of such stroke due to the force of gravity, is friction applied mainly on the rock lever 92 by the friction plate 123 secured to and underlying the side bar 15 adjacent the free end of said lever. It has been found however, that when the machine is operated with the baling chamber empty or only lightly charged with baling material that the feeder would violently strike the bottom of the baling chamber and to guard against this, a cushioning spring 124 is fitted on the slide rod 109 forward of the front supporting guide 110, so that it shall be compressed by the bar 111 during the latter part of the rearward movement thereof, the parts being so proportioned that the spring will be fully compressed before the feeder can strike the bottom of the baling chamber. In this connection it will be apparent that the resistance of the spring to compressive action, will have a regulating effect on the latter part of the power stroke of the feeder by tending to prevent acceleration thereof through the impetus or momentum it acquires after it attains a position where the force of gravity is added to the impelling force of the lug 74, on catch 99. The spring 124 also tends to aid each lug 74 in starting the return of the feeder to elevated position, by pressing forward on the bar 111.

To effectively brace the upper end of the power shaft, a cross brace 125 extends between the side bars 15 and against the rear half of the upper bearing for said shaft and parallel longitudinal tie-rods 126 are secured to cross bar 71 and extend through brace 125, the said upper bearing for shaft 16 and the gooseneck and the cross bar or brace 14. In Fig. 6 is also shown the crossed braces 127 secured at their ends in any suitable manner, not shown, to the said bars 15 to further strengthen and brace the front end of the framework, and the rear part of said frame work is braced by a cross bar 128, and crossed bars 129 as shown by Fig. 3. The special method of stiffening and bracing the frame is of course unimportant, the bracing referred to being illustrated as a simple, efficient and economical construction for the purpose mentioned.

As the function and operation of all the parts have been explained in connection with the detailed reference thereto, it is not believed that a recapitulation of the entire operation is essential to the full understanding of the invention.

I claim:

1. The combination in a baling press, of a baling chamber having a hopper, a plunger in the baling chamber, a pitman connected with the plunger, a feeder forcing charges of the baling material from the hopper into the baling chamber, in advance of the plunger, a driven wheel provided with a pair of lugs, means rotatable with the said wheel to engage the pitman and cause the same to make its power stroke, means to effect the recoil of the pitman and plunger, connections whereby one of said lugs shall cause the feeder to make its power stroke down through the hopper and into the baling chamber after the recoil of the pitman occurs, and means whereby the other lug of the said wheel shall effect reëlevation of the feeder to prevent the plunger on its next power stroke striking said feeder; said connections for effecting the power stroke of the feeder being adapted to yield in the event the feeder is arrested before said stroke is completed, without interfering with the continued movement of the lug for operating said connections.

2. The combination in a baling press, of a baling chamber having a hopper, a rotatable trip lever, a pitman for actuation by said trip lever, a plunger pivoted to the pitman within the baling chamber, a wheel rotatable with the trip lever and provided with a pair of lugs, a transverse shaft, a feeder mounted on said shaft for forcing baling material from the hopper into the baling chamber, a lever rotatable with said shaft, a rock lever, a spring-retracted connection pivotally linking one end of the first-named lever to the said rock lever, a slide bar pivoted to the other end of said rock lever and provided with a pivoted catch for engagement and operation by each of the lugs of said wheel to effect the power stroke of the feeder, means to trip said catch from the path of said lugs as the said power stroke is effected, a slide bar linked to the other end of said first-named lever, a catch pivoted to the front end of said slide bar and adapted to be engaged and drawn forward by one of said lugs of said wheel after the first-named catch has been tripped from engagement with the other lug of said wheel to effect the reëlevation of the feeder, and means to trip the said second catch from the path of the actuating lug as the reëlevation of the feeder is completed.

3. The combination in a baling press of a baling chamber having a hopper, a rotatable trip lever, a pitman for actuation by said trip lever, a plunger pivoted to the pitman within the baling chamber, a wheel rotatable with the trip lever and provided with a pair of lugs, a transverse shaft, a feeder mounted on said shaft for forcing baling material from the hopper into the baling chamber, a lever rotatable with said shaft, a rock lever, a spring-retracted connection pivotally linking one end of the first-named lever to the said rock lever, a slide bar pivoted to the other end of said rock lever and provided with a pivoted catch for engagement and operation by each of said lugs of the wheel to effect the power stroke of the feeder, means to trip said catch from the path of said lugs as the said power stroke is effected, a slide bar linked to the other end of said first-named lever, a catch pivoted to the front end of said slide bar and adapted to be engaged and drawn forward by one of said lugs of said wheel after the first-named catch has been tripped from engagement with the other lug of said wheel to effect the reëlevation of the feeder, means to trip the said second catch from the path of the actuating lug as the reëlevation of the feeder is completed, and resilient means to regulate and cushion the latter part of the power stroke of the feed and assist the second lug and catch in overcoming the inertia of the feeder in the reëlevating operation thereof.

4. The combination in a baling press of a baling chamber, a plunger therein, a vertical power shaft, a pair of horizontal trip levers carried by said shaft, a suitably supported swing arm disposed in the path of said trip lever and at the opposite side of the power shaft from said pitman, a link pivotally connecting said swing arm with said pitman and adapted as one trip lever engages the pitman to impart power movement thereto, to hold the said pitman in engagement with said trip lever at the beginning of and for the greater part of its stroke through the engagement of the other trip lever with said swing arm, an arm underlying the pitman to maintain the same in the horizontal plane of the trip levers, an air cylinder at the opposite side of the pitman from said power shaft and provided with a valve controlled air exhaust at its outer end, a piston in said cylinder provided with an inwardly projecting stem to be engaged by the adjacent side of the pitman on its recoil movement, and a spring to effect the recoil of the pitman after the power stroke of the plunger has been completed.

5. The combination in a baling press of a baling chamber, a plunger therein, a vertical power shaft, a pair of horizontal trip levers carried by said shaft, a suitably supported swing arm disposed in the path of said trip lever and at the opposite side of the power shaft from said pitman, a link pivotally connecting said swing arm with said pitman and adapted as one trip lever engages the pitman to impart power movement thereto, to hold the said pitman in engagement with said trip lever at the beginning of and for the greater part of its stroke through the engagement of the other trip lever with said swing arm, an arm underlying the pitman to maintain the same in the horizontal plane of the trip levers, an air cylinder at the opposite side of the pitman from said power shaft and provided with a valve controlled air exhaust at its outer end, a piston in said cylinder provided with an inwardly projecting stem to be engaged by the adjacent side of the pitman on its recoil movement, a spring secured at its front end to a fixed part of the press, and flexible connections of unequal length between the other end of the spring and a fixed point on the press and said plunger for maintaining the spring in stretched condition regardless of the position of the plunger.

6. In a baling press, a baling chamber, a reciprocatory plunger therein, means for imparting power movement to said plunger, and connections for effecting the recoil movement of said plunger, comprising a spring attached at its front end to a fixed part of the press, and a pair of flexible connections of unequal length connecting the opposite end of said spring with a point on the press and said plunger, the connection of greatest length being connected to the plunger.

7. In a machine of the character described, a baling chamber having a hopper, a plunger in the baling chamber, a feeder for forcing baling material from the hopper into the baling chamber in advance of the plunger, a lever rigid with the feeder, rotatable means for effecting the power stroke of the plunger, a rock lever, means rotatable with the means for effecting the power stroke of the plunger to operate said rock lever, a spring-retracted connection linked at its opposite ends to the first-named lever and said rock lever for transmitting power from the latter to the former and for yielding to permit the feeder to be arrested in its power stroke in the event it encounters an unyielding obstruction, without interfering with the operation of the rock lever, and for restoring said levers to their original relation when the rock lever is returned to its initial position.

8. In a machine of the character described, a baling chamber having a hopper, a plunger in the baling chamber, a feeder for forcing baling material from the hopper into the baling chamber in advance of the plunger, a lever rigid with the feeder, rotatable means for effecting the power stroke of the plunger, a rock lever, means rotatable with the means for effecting the power stroke of the plunger to operate said rock lever, a spring-retracted connection linked at its opposite ends to the first-named lever and said rock lever for transmitting power from the latter to the former and for yielding to permit the feeder to be arrested in its power stroke in the event it encounters an unyielding obstruction, without interfering with the operation of the rock lever, and for restoring said levers to their original relation when the rock lever is returned to its initial position, and means to return the rock lever and the feeder to their original positions.

9. In a machine of the character described, a baling chamber having a hopper, a plunger in the baling chamber, a feeder for forcing baling material from the hopper into the baling chamber in advance of the plunger, a lever rigid with the feeder, rotatable means for effecting the power stroke of the plunger, a rock lever, means rotatable with the means for effecting the power stroke of the plunger to operate said rock lever, a spring-retracted connection linked at its opposite ends to the first-named lever and said rock lever for transmitting power from the latter to the former and for yielding to permit the feeder to be arrested in its power stroke, in the event it encounters an unyielding obstruction, without interfering with the operation of the rock lever, and for restoring said levers to their original relation when the rock lever is returned to its initial position, means to return the rock lever and the feeder to their original positions, and means to regulate and cushion the latter part of the power stroke of the feeder in the event the baling chamber is empty or the charge therein is too light to materially resist such movement of the feeder.

10. In a machine of the character described, a baling chamber having a hopper, a plunger in the baling chamber, a feeder for forcing baling material from the hopper into the baling chamber in advance of the plunger, a lever rigid with the feeder, rotatable means for effecting the power stroke of the plunger, a rock lever, means rotatable with the means for effecting the power stroke of the plunger to operate said rock lever, means for transmitting power from the rock lever to the first-named lever to effect the power stroke of the feeder, a reciprocatory bar linked to the other end of said first-named lever to be drawn rearward when the power stroke of the feeder is made, and to be drawn forward by the rotatable means for operating said rock lever after the power stroke of the feeder has been made to reëlevate the feeder and restore the rock lever to its initial position.

11. In a machine of the character described, a baling chamber having a hopper, a plunger in the baling chamber, a feeder for forcing baling material from the hopper into the baling chamber in advance of the plunger, a lever rigid with the feeder, rotatable means for effecting the power stroke of the plunger, a rock lever, means rotatable with the means for effecting the power stroke of the plunger to operate said rock lever, means for transmitting power from the rock lever to the first-named lever to effect the power stroke of the feeder, a reciprocatory bar linked to the other end of said first-named lever to be drawn rearward when the power stroke of the feeder is made, and to be drawn forward by the rotatable means for operating said rock lever after the power stroke of the feeder has been made to reëlevate the feeder and restore the rock lever to its initial position, and means to cushion the latter part of the power stroke of the feeder and assist in starting the same upon its return movement.

12. In a machine of the character described, the combination of a baling case, a plunger therein, means for imparting power movement to the plunger, a feeder, an extensible element connected to operate the feeder, means actuated by the plunger-operating means when the plunger is withdrawn or in inoperative position, for imparting power movement to the extensible element to operate the feeder, and means for tripping the means for operating said element from operative relation to the plunger-operating means when the feeder has completed its power stroke; said extensible element elongating in the power stroke of the feeder in the event the latter is prevented from completing such stroke.

13. In a machine of the character described, the combination of a baling case, a plunger therein, means for imparting power movement to the plunger, a feeder, an extensible element connected to operate the feeder, means actuated by the plunger-operating means when the plunger is withdrawn or in inoperative position, for imparting power movement to the extensible element to operate the feeder, means for tripping the means for operating said element from operative relation to the plunger-operating means when the feeder has completed its power stroke, yielding means for preventing elongation of said extensible element in the ordinary movements of the feeder, and means for returning the feeder and its operative connections to their original positions in the interim between said tripping action and the ensuing power stroke of the plunger.

14. In a machine of the character described, the combination of a baling case, a plunger therein, means for imparting power movement to the plunger, a feeder, a slide bar, a spring-pressed catch carried thereby, connections for transmitting power between the slide bar and the feeder, means for engaging the catch and causing the same to effect power movement of the feeder, means to trip the catch from the engaging power means while the plunger is retracted, and means to return the feeder, slide bar and said connections to their original positions.

15. In a machine of the character described, the combination of a baling case, a feeder for operation therein, a spring-pressed catch, connections for transmitting power between the feeder and catch, means for engaging and moving the catch to cause the feeder to move to inoperative position, and means to repress and thereby trip the catch from engagement with said engaging means when the feeder attains its inoperative position.

16. In a machine of the character described, the combination of a baling case, a feeder for operation therein, a spring-pressed catch, connections for transmitting power between the feeder and catch, means for engaging and moving the catch to cause the feeder to move to inoperative position, means to repress and thereby trip the catch from engagement with said engaging means when the feeder attains its inoperative position, and means for imparting power movement to the feeder and the consequent return of said catch to its original position.

In testimony whereof I affix my signature in the presence of two witnesses.

CHARLES M. ERTEL.

Witnesses:
 HELEN KIEFER,
 JAMES MCKINNAY.